3,244,540
HIGH ALUMINA REFRACTORY BODIES
Roger Hailstone, Wilmington, Del., and Ludwig Edward Seufert, Boothwyn, Pa., assignors to E. I. du Pont de Nemours and Company, Wilmington, Del., a corporation of Delaware
No Drawing. Filed July 11, 1963, Ser. No. 294,251
8 Claims. (Cl. 106—67)

This invention relates to fired refractory bodies of high alumina content and methods for their preparation.

Such bodies are conventionally made by sintering alumina of high purity or by firing various mixtures of alumina (high purity or crude) and aluminum silicates (such as clays) or silica.

Due to the nature of the materials employed and the processes used, the physical properties obtained are a compromise between desired levels. For a given composition the flexural strength has an inverse relationship to the porosity while permeabiltiy and thermal shock resistance have a direct relation to the porosity.

An object of this invention is to provide a refractory body containing at least 75% by weight of alumina and having a relatively low thermal conductivity and low permeability in combination with high strength and thermal shock resistance. Other objects will be apparent from the following disclosure.

The novel product of this invention is a refractory body consisting essentially of at least about 75% by weight of $Al_2O_3$ (preferably over 85%) and at least about 4.5% by weight of $SiO_2$, substantially all the $SiO_2$ being present as mullite. In the refractory body alpha alumina particles are bonded by a porous phase of dense walls which define cells with an avareage diameter of 6 to 25 mils. The cells occupy from about 5 to 25% of the total volume of the refractory body, and the porous bonding phase is selected from the class consisting of alpha alumina, mullite and mixtures of alumina and mullite in the form of crystals having an average grain size of less than about 1 micron in diameter.

The preferred products are further characterized by a porosity of 29 to 40%, an air permeability of from 0 to 100 $cm.^2 \times 10^{-11}$, a flexural strength at 25° C. in excess of 1500 pounds per square inch, a coefficient of thermal conductivity less than about 17 (B.t.u./hour/square foot/ ° F./inch) and very high resistance to thermal shocks.

The novel product of this invention is made by mixing from about 5 to 40% (preferably 7 to 30%) by weight of particles of aluminum or its alloys containing a major amount of aluminum with from 10 to 46% (preferably 15 to 40%) by weight of a plastic clay, and between about 1 and 10% by weight based on the weight of the clay of a fluxing agent, and from about 30 to 85% (preferably 52 to 77%) by weight of tabular alumina. The weight of alumina present as particles smaller than 200 mesh in combination with alumina from in situ oxidized aluminum and the alumina in the clay should be equal to or greater than the stoichiometric weight required to form mullite from the $SiO_2$ present in the clay. The mixture is shaped into a body having a porosity of at least 20% after removal of volatile materials, and fired in an oxidizing atmosphere at a temperature between 650° C. and the melting point of the clay, for a period of time to oxidize at least 95% of the aluminum, (preferably greater than 99%), the rate of heating being controlled so that the temperature of the shaped mixture does not exceed the ambient temperature by more than 100° C. (preferably 50° C.).

Aluminum particles and particles of alloys of aluminum with other metals in which aluminum constitutes the major component may be used. The metal used is preferably clean and free from grease and oil. The aluminum particles should have one dimension of at least about 7 mils, a second dimension of at least 0.5 mil and a third minor dimension, i.e., between about 0.5 mil and 200 mils. The major dimension should not exceed 200 mils. For example, if spheres of aluminum are used, they must have a diameter between 7 and 200 mils (between about 3.5 and 80 mesh). Cylindrical rods as fibers must have a diameter of between 0.5 and 200 mils and a length of between 7 and 200 mils.

Up to about 25% of the total weight of the aluminum can be present as fine particles of 80 to 200 mesh.

Suitable fluxing agents are an oxide of a metal from the class consisting of the alkali metals, the alkaline earth metals, vanadium, chromium, molybdenum, tungsten, copper, silver, zinc, antimony, and bismuth, precursors of these oxides and hydroxides of the alkali metals. The oxides and hydroxides of the alkali metals, magnesium, strontium and barium are preferred.

Among suitable precursors of these materials may be mentioned the organic salts such as acetates, benzoates, etc., and inorganic salts as bisulfates, bisulfites, bromates, nitrates, silicates, sulfates, sulfites, thiosulfates, etc., of the recited metals. While not "per se" within the class of useful fluxing agents, these compounds do, under conditions of the reaction, yield compounds within the above defined class. In addition, trialkyl tin oxides and lead silicate ($PbSiO_3$) are also useful as fluxing agents.

In a preferred embodiment of the invention the alumina used should contain between 0.02 and 10 parts of a fluxing agent per 100 parts of aluminum used and the clay should contain between 1 and 10 parts of a fluxing agent per 100 parts of clay. Satisfactory (but less preferred) products can be made from aluminas and/or clays that are deficient in fluxing agent content by adding the fluxing agent to the mixture.

The alumina employed in this invention and termed tabular alumina (defined in Encyclopedia of Chemical Technology vol. I, page 641 (1947)) is a high fired alumina of high purity consisting of coarse, well developed alpha alumina crystals. Alcoa Tabular Alumina (made by the Aluminum Company of America, Pittsburgh, Pa.) is suitable. It shrinks less than about 10% during 1 hour at 1800° C. and has a bulk density in excess of 100 pounds per cubic foot.

The particle size of the alumina can vary between about 4 mesh and −325 mesh. Graded mixtures of coarse and fine particles can be utilized to afford optimum packing as is well known in the art. As previously pointed out, the amount of alumina present in −200-mesh particle size should be sufficient in combination with the alumina from aluminum to form mullite from the excess silica present.

By the expression "plastic clay" is meant a substance with a composition corresponding to that of an aluminosilicic acid usually containing other substances which become plastic (i.e., exhibits plastic flow) when mixed with the proper amount of water. The plastic clay provides the proper forming properties for the refractory mix, serves as a green binder and is a source of silica to form mullite.

Suitable clays may be found in such classes as ball clay, bonding clay, and the like which will be obvious to one skilled in the art.

The clay used should be selected or blended to give the desired ratio between silica and alumina in the final product. The suggested use of 10 to 40% clay is based on a silica content of from about 45 to 65% and an alumina content of from about 22 to 39%.

In addition to natural substances, synthetic mixtures of silica and a plastic alumina-containing substance can be used.

In some cases it is advantageous to add minor amounts of water, ethyl alcohol, ethylene glycol, acetone, solutions of carboxy methyl cellulose, rubber, gum arabic, polyvinyl alcohol, natural gums, glue and the like to increase the green strength of the shaped object. Preferably a material is used that will burn out under the firing conditions. From about 0.1% to about 2% binder is usually adequate.

The unfired mixture of metal, fluxing agent, alumina and plastic clay should be compacted during the shaping process to afford a porosity after removal of volatile materials (as measured after heating at 500° C. until equilibrium is reached) of between about 20 and 50%.

The dried "green" molded object is then heated in an oxidizing atmosphere such as air, oxygen or mixtures of oxygen and inert gases at a temperature of at least about 650° C. but below the ignition temperature of the system at the concentration of oxygen employed. The exact conditions for firing will depend upon the green porosity of the shaped object, the amount of metal, the amount and kind of fluxing agent and the temperature. These interactions and variations among them will be apparent to one skilled in the art.

To make the best products, the above-mentioned variables should preferably be selected so that a spontaneous and rapid ignition does not take place, or a spontaneous and rapid reduction of the nonaluminum constituents does not occur. This is conveniently controlled by adjustment of the heating rate and/or flow of oxygen through the furnace as guided by a thermocouple included in a molded refractory mixture in the oven. In general at least the first stages of oxidation should be carried out at a relatively low temperature. It is preferred to heat at a relatively low temperature initially, until a stress bearing oxide film develops which holds the molded shape of the aggregate during subsequent further oxidation at a higher temperature.

The oxidation of the aluminum is from 90 to 99% complete in the final structure. Preferably the product contains less than 1% of metallic aluminum.

In the following examples, porosities are calculated from the apparent density (weight of the body in air/mass volume of the body including opened and closed pores), and the density of the solid material as obtained by crushing the sample and determining the volume of the solids and their weight. The volume measurement is conveniently made on an air comparison pycnometer (model 930, made by Beckman Instruments, Inc. of Fullerton, California). As an approximation, the porosity may be calculated from the apparent density and the calculated density of the solid material in a body of known composition.

All sieve measurements are made with U.S. Sieve Series.

Flexural strength is measured according to ASTM Standard 1958, part 4, page 670, Test No. C293-57T with the use of a span width of 1 to 8 inches.

In air permeability test a sample is cut to 2.0 x 2.8 x 2.8 cm. (±0.2 cm.). Four sides are coated with beeswax. One side is open for the entrance of air and a funnel is attached to an aluminum gasket which is then sealed to the opposite side with beeswax. Air is pulled through the sample and flowmeter to a vacuum pump.

$$\text{Permeability in cm.}^2 = \frac{B \times C \times E}{A \times D \times 60}$$

A = length of sample x width of sample in cm.
B = height of sample in cm.
C = flow of air in ml./minute
D = $\Delta P$ of vacuum in dynes/cm.$^2$
E = viscosity of air (0.000183 poise).

The hot load subsidence test is run on a full size brick according to ASTM-C-210. The percent hot load subsidence in the percent of the original height that subsides (or compacts) under a stated loading and temperature.

Thermal shock resistance is determined by a test similar to ASTM C122-5. A ½ brick size sample (4.5" x 4.5" x 2.5" or 3") is placed in a brick panel and the face of the brick heated to 1370° C. by a gas flame for 10 minutes and then cooled by forced air for 10 minutes. This cycle is repeated 12 times. The percent of the original weight that is lost by spalling is reported as "Thermal Spalling." If much weight is not lost the type and extent of cracking is reported.

Thermal conductivity is measured by standard methods at 800° C.

The products of this invention are aggregates of alpha alumina particles and a porous bonding phase. The latter is constituted by dense wall or shell material defining pores or cells which correspond in shape and size to the original metal particle prior to the in situ oxidation. The cells may be empty or contain some unoxidized aluminum in the case of partial conversion. These pores are to be distinguished from the pores existing in the refractory body but outside of the bonding phase which arise from removal of volatiles or which existed in the green body.

The pores within the bond medium (exclusive of micropores, below 0.5 mil (when measured in a plane cut through the body have an average diameter (i.e., length in a section) of between about 2 and 44 mils. Preferably, the pore size will range between about 4 and 30 mils. These pores have the appearance of closed cells. The walls surrounding the pores of the bond have a minimum thickness of about 0.3 mil and are substantially homogeneous for at least this width. By "substantially homogeneous" is meant that the wall is free of occlusions of non-bond material or voids greater than about 0.1 mil in diameter for the minimum thickness.

In general, the aluminum particles which are oxidized in situ are located a sufficient distance apart to permit wall formation of at least the minimum thickness between the voids formed from the metal. However, where two or more metal particles in the green mix are so close that a 0.3 mil wall cannot form between the voids, the wall referred to above is that surrounding the combination of voids.

The maximum thickness of the wall surrounding a pore within the bond will be about the diameter of the enclosed pore. However, the walls of two adjacent pores may integrate to give a double wall thickness between them. Also, the walls may appear thicker in a particular planar section. Since the structure is three-dimensional, the thickness of a wall can best be determined from a section cut perpendicular to the major axis of the cell.

The crystalline grains of the bond have a density function of from between about 0.5 and 1.0. Structures of this type are exemplified in the examples.

The following "density function" may be used as a measure of the density of the bonding phase:

Density function = average $$\left[ \frac{\text{part of perimeter in contact with other grains}}{\text{total perimeter of grain under consideration}} \right]$$

The density function is determined for each grain by examining a photomicrograph of a polished section of the sample and the results are averaged. Most products of this invention, as made, show no visible grain boundaries after etching and viewing at 750× magnification. In this event the value of the density function approaches an upper limit of 1.0. Grain growth can occur with prolonged heating at, for example, 100 hours at 1600° C. to afford an average grain size of about 8 microns. Further grain growth is limited by the thickness of the skeleton and the value of the density function approaches the lower limit of 0.5.

Cell (or pore) size is determined by the lineal analysis of microstructure technique as discussed by W. D. Kingery in "Introduction to Ceramics," pages 412–417 (published by John Wiley and Sons, Inc., New York, 1960).

The products of this invention are particularly useful as furnace linings, kiln furniture, combustion burner parts and as glass-contacting refractories. The low permeability affords greatly decreased glaze and glass penetration in kiln furniture and in glass-tank liners and easier degassing of furnace linings for use under inert atmospheres.

EXAMPLE I

This example illustrates the advantage of a mullite-bonded alumina product of this invention over a clay-bonded product.

Twenty parts of clay, 71 parts of alumina, 6 parts of aluminum flake, 3 parts of aluminum mill granules and 7.5 parts of water are thoroughly mixed and molded in a 9 x 4.5 inch mold to a depth of 3 inches under about 3300 p.s.i. pressure. The brick is air-dried, oven-dried up to 120° C. and then fired in an air atmosphere according to the following schedule to make item $a$:

7 hours, at 150° C.;
6 hours, at 150–500° C.;
14 hours, at 700° C.;
32 hours, at 750° C.;
10 hours and then 10 hours for each additional 100° C. up to 1400° C. (14 hours). The temperature is raised at the rate of 1 to 3½ hours per 100° C., at 800° C.

The temperature of the interior of the brick does not increase more than 50° C. over the temperature of the furnace during the firing. Complete conversion of the aluminum to alumina occurs as determined by the weight gain.

Item $b$ is made in the same manner using 29% clay and 71% alumina.

The clay used is a bonding clay (Cedar Heights Clay Co., Oakhill, Ohio) which has the following analysis:

Ignition loss 9.4%, $Al_2O_3$ 57.3%, $SiO_2$ 28.5%; Alkali metal oxides 1–5%, MgO 0.22%, CaO 0.08%; Other impurities 3.5%.

The alumina used is a high fired alumina which passes 325 mesh (Alcoa tabular alumina, 99.5+% $Al_2O_3$ and about 0.02% $Na_2O$).

The aluminum flake is 8/60 mesh (Alcoa 151 aluminum flake).

The mill granules (Reynolds) is 30/100 mesh of which 66% is retained on a 60-mesh screen and 86% is retained on an 80-mesh screen.

The alkali oxides in the clay and alumina amount to over 2% of the weight of the aluminum and serves as the fluxing agent.

Approximately 12 parts of the fine grain alumina plus the alumina made from aluminum (17 parts) is needed to react with the $SiO_2$ of the clay to yield mullite. The final composition of item $a$ is approximately 61% $Al_2O_3$ and 38% mullite.

It is noted that the mixture containing no aluminum (for item $b$) is much more difficult to mold than item $a$.

Following are typical values of physical properties obtained on bricks made according to the above procedure.

Table I

|  | Item $a$ | Item $b$ |
|---|---|---|
| Apparent density, grams cm.³ | 2.42 | 2.41 |
| Flexural strength at 25° C., p.s.i. | 2,180 | 1,600 |
| Flexural strength at 1,550° C., p.s.i. | 710 | 350 |
| Spalling loss, percent | 0 | 15.4 |
| Hot load subsidence at 25 p.s.i.: |  |  |
| At 1,650° C. | 0.7–0.8% |  |
| At 1,720° C. | 1.8–2.4% |  |
| A coefficient of thermal conductivity | 15 |  |
| Permeability, cm.² | 11×10⁻¹¹ |  |

The superiority of the product obtained from aluminum, especially at elevated temperatures is apparent.

Useful products having similar properties to item $a$ are made in a similar manner from mixtures containing as little as 5% aluminum.

EXAMPLE II

Mixtures containing 20 parts of clay, 71 parts of alumina, 9 parts of aluminum and 7.5 parts of water are made, molded to 9 x 4.5 x 3 inch bricks under 3300 p.s.i. pressure and dried. The bricks are fired in a manner similar to Example I to a maximum of 1500° C.

The clay and alumina of Example I are used. The various forms of aluminum used are:

Flake (F) of Example I 100% retained on 60-mesh;
Mill granules (M) of Example I (86% retained on 80 mesh, 100% retained on 100 mesh);
Grain ingot (G) 28/42 mesh (Alcoa 99.6);
Granules (D) 30/200 mesh (about 85–90% is retained on a 100-mesh screen, 75–88% is retained on 80-mesh screen).

The types of aluminum used and the bulk density, flexural and compressive strengths as measured at 25° C. for the fired bricks are given in Table II.

Table II

| Item | Aluminum used | Properties of fired bricks | | |
|---|---|---|---|---|
| | | Density, g./cm.³ | Strength, p.s.i. | |
| | | | Flexural | Compressive |
| $a$ | F/M, 6/3 | | 2,180 | 5,900 |
| $b$ | D/M, 6/3 | 2.20 | 1,950 | 6,850 |
| $c$ | G/M, 6/3 | 2.31 | 1,590 | 5,730 |
| $d$ | G, 9 | 2.34 | 1,780 | 4,850 |
| $e$ | M, 9 | 2.18 | 1,435 | 5,150 |
| $f$ | F, 9 | 2.23 | 1,260 | 4,710 |

EXAMPLE III

This example illustrates the advantage of using mixed grain sizes for the alumina in the process of this invention.

Various mixtures of clay, aluminum metal and alumina are mixed, molded and fired according to the procedure of Example I. The compositions are given in Table III. The aluminum consists of a mixture of ⅔ flake and ⅓ mill granules as in Example I. The clay and −325-mesh alumina of Example I is used. The coarse alumina is the same as the fine alumina except for particle size.

By comparing the properties of items $a$, $b$, and $c$ in Table III it is noted that the use of mixed sizes of alumina grains gives a product superior to the products containing all fines or all coarse alumina particles. Item $a$ lacks the fine alumina needed to convert the residue of the clay to mullite. Items $a$, $b$, and $c$ have flexural strengths at 1550° C. of 190, 710, and 440 p.s.i. respectively.

Items $e$ and $f$ have an excess of in situ-formed alumina over that needed to convert all the clay to mullite.

Item $c$ has a permeabiilty of $9 \times 10^{-11}$ cm.²

Table III

| Item | Al, percent | Clay, percent | Alumina | | Properties of Fired Product | | | Total Al₂O₃, percent |
|------|-------------|---------------|---------|---|------------------------------|---|---|----------------------|
| | | | −325 mesh, percent | 28 mesh, percent | Bulk density | Strength at 25° C., p.s.i. | | |
| | | | | | | Flexural | Compressive | |
| a | 9 | 20 | 0 | 71 | 2.55 | 1,100 | 3,600 | 88.5 |
| b | 9 | 20 | 71 | 0 | 2.42 | 2,180 | 5,880 | 88.5 |
| c | 9 | 20 | 35.5 | 35.5 | 2.67 | 2,320 | >9,460 | 88.5 |
| d | 18 | 27 | 33 | 22 | 2.66 | 2,940 | 8,260 | 85 |
| e | 21 | 20 | 59 | 0 | 2.42 | 2,700 | 8,670 | 90 |
| f | 24 | 21 | 33 | 22 | 2.64 | 2,150 | 9,510 | 89 |

In accordance with the present invention the use of tabular alumina gives results which are unexpectedly superior to those achieved with other conventional types of alumina. This is apparent from the data presented below.

The following results were obtained on 1″ x 1″ x 8″ bars using 71% of different aluminas, 20% of Example I clay, 6% Al flake and 3% Al mill granules:

| Item | Alumina | Flex at 25° | Observation |
|------|---------|-------------|-------------|
| 1 | A 200/325 mesh | 225 | Laminated badly. |
| 2 | A 100/325 mesh | 100 | Laminated, cracked. |
| 3 | B 100/325 mesh | 315 | Slightly cracked crumbly surface. |
| 4 | C 100/325 mesh | 240 | Slight cracking crumbly surface. |
| 5 | Tabular −325 mesh | 480 | Good appearance. |

Using 40% alumina, 37% of the clay, 16% flake and 8% mill granules gave flexural strengths of 1190, 1010, 885, 930 and 3230 for the same order of aluminas as above. The item made with tabular alumina had the best appearance again and had a compressive strength of 11,650 p.s.i. vs. 4100 which was the highest value of the other samples.

Alumina A above has been fired to a relatively low temperature with an ignition loss of over 30% and a bulk density (loose) of 68 pounds/cubic foot. Aluminas B and C are more highly fired than A so that the losses on ignition are 0.7 and 0.1% respectively. However both have relatively low bulk densities (loose) of less than 60 pounds/cubic foot.

What is claimed is:

1. A refractory body consisting essentially of at least 75% by weight of alumina and at least about 4.5% by weight of silica, substantially all of the silica being present as mullite, the said refractory being constituted by alpha alumina particles that are bonded by a crystalline porous phase selected from the class consisting of alpha alumina, mullite and mixtures of alumina and mullite, the crystals of said bonding phase being less than about one micron in diameter.

2. The product of claim 1 wherein the porous bonding phase comprises dense walls which define cells with an average diameter of 5-25 mils.

3. A method of making a refractory body which is resistant to thermal shock comprising mixing (1) from about 5–40% by weight of particles of the group consisting of aluminum and alloys thereof containing a major amount of aluminum, said particles having one dimension of at least about 7 mils, a second dimension of at least 0.5 mil and a third dimension between about 0.5 and 200 mils, the major dimension not exceeding 200 mils, with (2) from 10–46% by weight of a plastic clay and (3) between about 1 and 10% by weight based on the weight of the clay of a fluxing agent and (4) from about 30–85% by weight of tabular alumina, shaping the particulate mixture into a body having a porosity of at least 20% after removal of the volatile materials and firing the said body in an oxidizing atmosphere at a temperature between 650° C. and the melting point of the clay, the rate of heating being controlled so that the temperature of the shaped body does not exceed the ambient temperature by more than 100° C.

4. The process of claim 3 wherein the firing is continued for a period of time sufficient to oxidize at least 95% of the aluminum.

5. The process of claim 3 wherein the amount of alumina present in −200-mesh particle size is sufficient in combination with the alumina resulting from oxidation of aluminum to form mullite with the excess silica of the clay.

6. The process of claim 3 wherein both the alumina and clay contain fluxing agent.

7. The process of claim 3 wherein the fluxing agent is selected from the group consisting of oxides and hydroxides of alkali metals and alkaline earth metals, the oxides of vanadium, chromium, molybdenum, tungsten, copper, silver, zinc, antimony, bismuth, and precursors of such oxides and hydroxides.

8. The process of claim 3 wherein the fluxing agent is an alkali metal oxide.

References Cited by the Examiner

UNITED STATES PATENTS 2,741,822  4/1956  Udy _____ 106—65

References Cited by the Applicant

UNITED STATES PATENTS 1,374,910  4/1921  Debats.
1,856,303  5/1932  White.
1,911,189  5/1933  Harris.
3,067,050  12/1962 Miller.

FOREIGN PATENTS 587,595  4/1947  Great Britain.
892,048  3/1962  Great Britain.

TOBIAS E. LEVOW, *Primary Examiner.*